(12) United States Patent
Johnson et al.

(10) Patent No.: US 6,467,263 B2
(45) Date of Patent: Oct. 22, 2002

(54) FILTER ASSEMBLY FOR A HYDROSTATIC TRANSMISSION

(75) Inventors: Kevin L. Johnson, Salem; Richard T. Ruebusch, New Albany, both of IN (US)

(73) Assignee: Tecumseh Products Company, Tecumseh, MI (US)

( * ) Notice: Subject to any disclaimer, the term of this patent is extended or adjusted under 35 U.S.C. 154(b) by 3 days.

(21) Appl. No.: 09/777,997

(22) Filed: Feb. 6, 2001

(65) Prior Publication Data

US 2002/0104314 A1 Aug. 8, 2002

(51) Int. Cl.[7] ............................................. F16D 39/00
(52) U.S. Cl. ......................................................... 60/454
(58) Field of Search .................................... 60/454, 487

(56) References Cited

U.S. PATENT DOCUMENTS

| | | | |
|---|---|---|---|
| 4,905,472 A | 3/1990 | Okada | 60/464 |
| 5,146,748 A | 9/1992 | Okada | 60/454 |
| 5,598,748 A | 2/1997 | Okada | 74/606 R |
| 5,647,249 A | 7/1997 | Okada | 74/606 R |
| 5,664,465 A | 9/1997 | Okada | 74/606 R |
| 5,697,264 A | 12/1997 | Andrews et al. | 74/665 GB |
| 5,752,417 A | 5/1998 | Okada et al. | 74/606 R |
| 5,755,098 A | 5/1998 | Irikura | 60/435 |
| 6,301,885 B1 * | 10/2001 | Johnson et al. | 60/487 |
| 6,314,730 B1 * | 11/2001 | Shimizu | 60/487 |

* cited by examiner

Primary Examiner—F. Daniel Lopez
Assistant Examiner—Thomas E. Lazo
(74) Attorney, Agent, or Firm—Baker & Daniels

(57) ABSTRACT

A hydrostatic transmission assembly includes a hydraulic pump and motor mechanism having a pump, a motor and at least one fluid passageway therebetween, a source of transmission fluid, at least one projection attached to the hydrostatic pump and motor mechanism which has a suction port therein, and a filter assembly comprising a filter element attached to an impermeable wall. The pump and motor are fluidly connected through the passageway and the passageway is in fluid communication with the source of transmission fluid through the suction port. The impermeable wall includes at least one hole therethrough and the projection extends through the hole and is sealingly engaged with the impermeable wall. Substantially all transmission fluid received by the pump and motor mechanism is passed through the filter element.

22 Claims, 8 Drawing Sheets

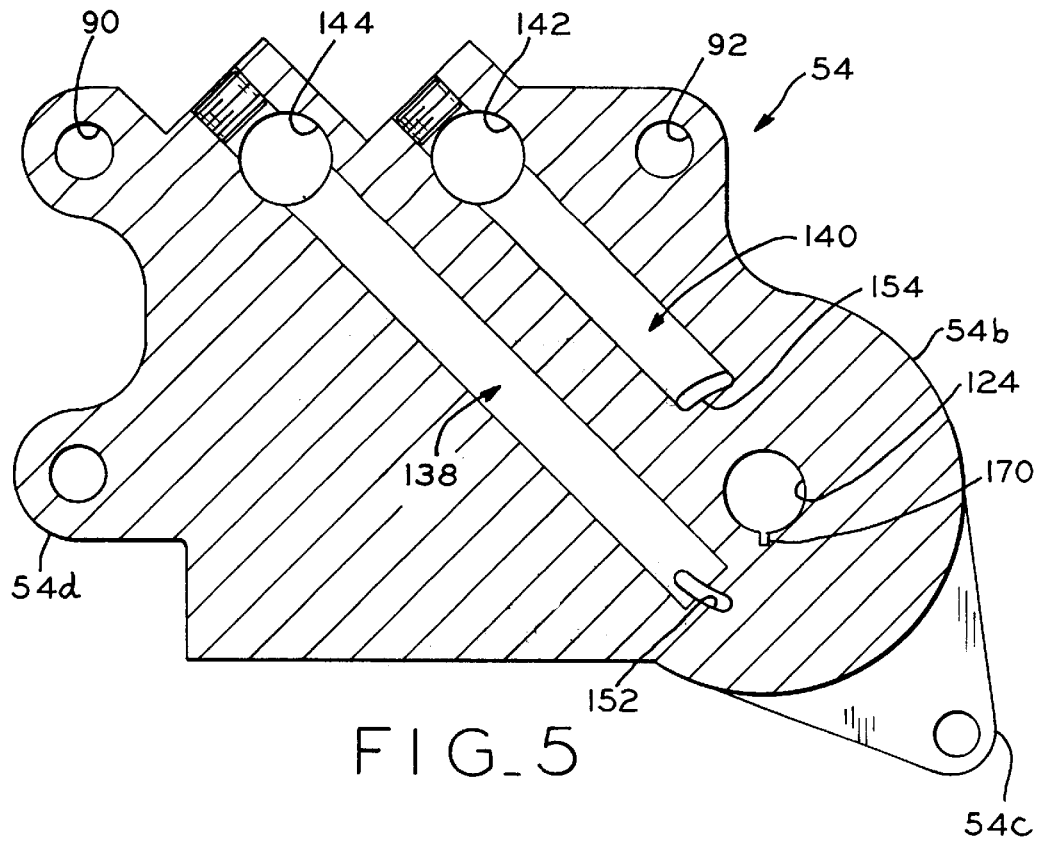
FIG_5
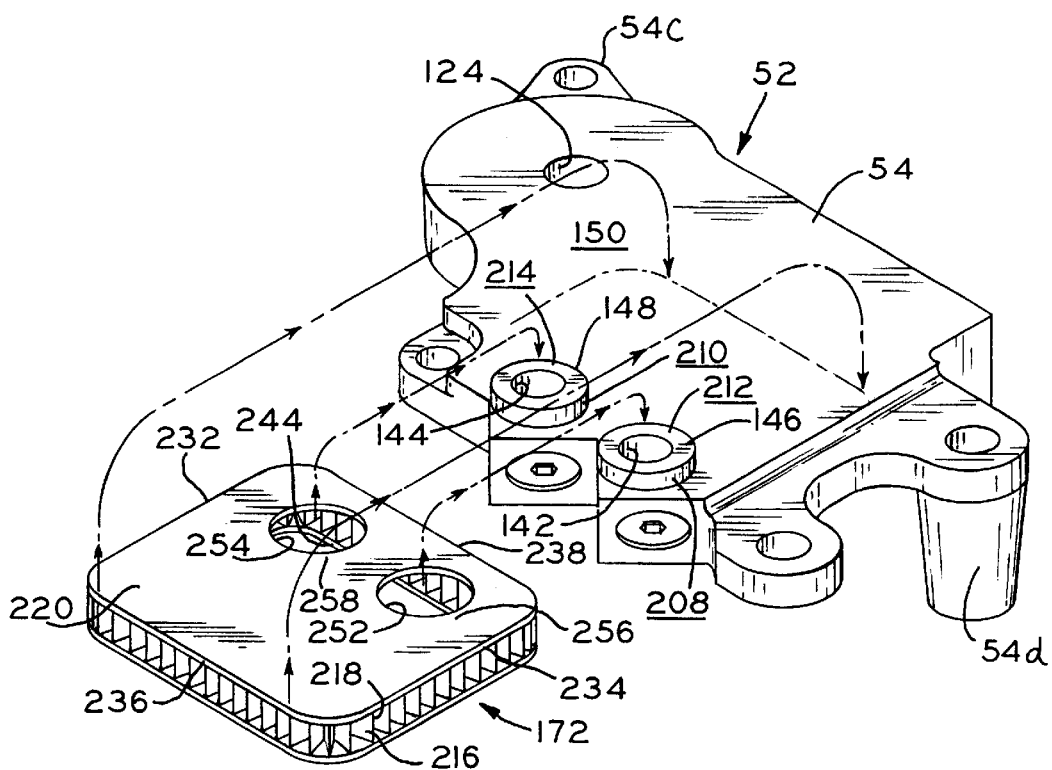
FIG_6

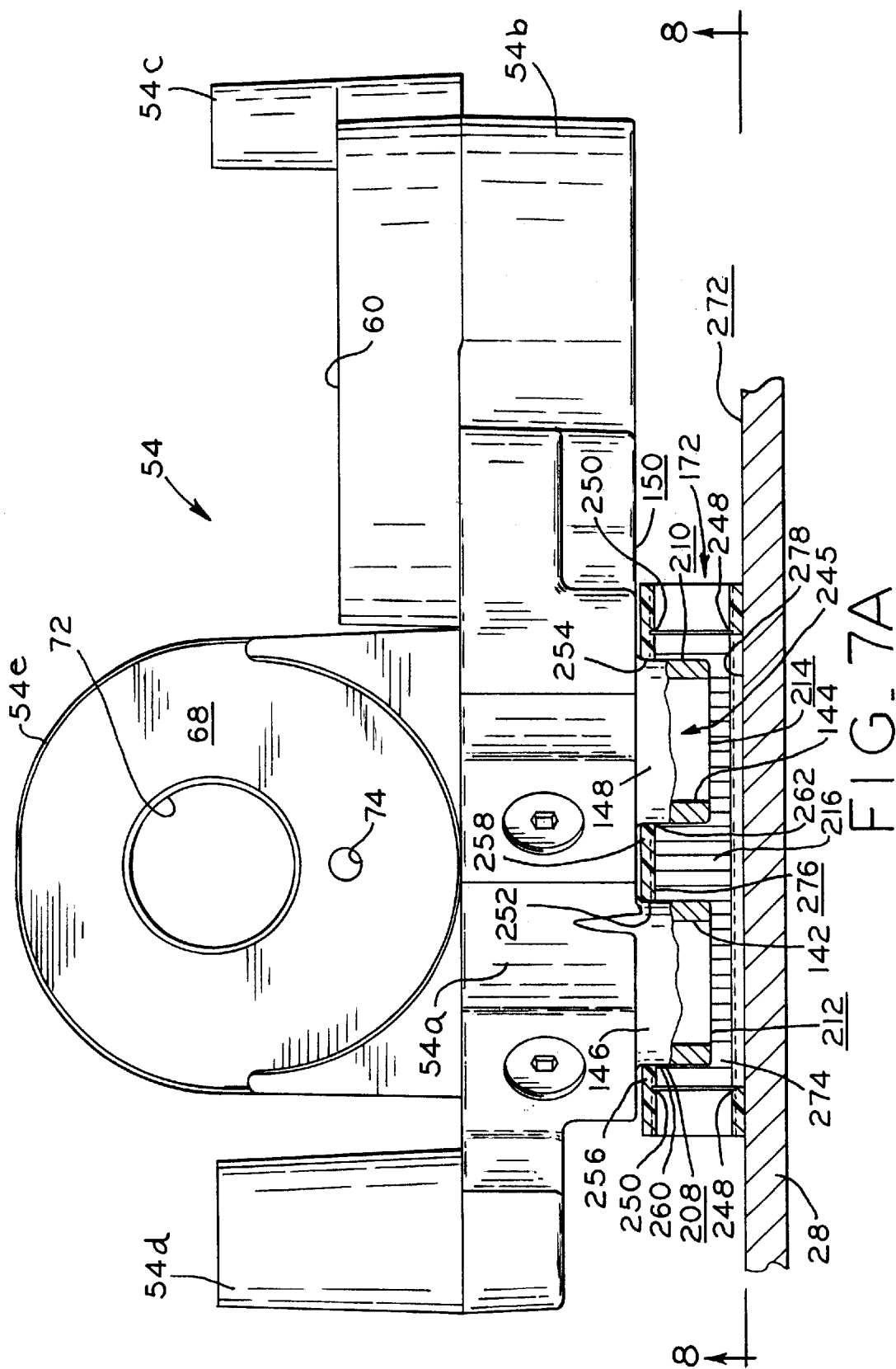

FILTER ASSEMBLY FOR A HYDROSTATIC TRANSMISSION

BACKGROUND OF THE INVENTION

The present invention relates to hydrostatic transmissions intended primarily for use in riding lawnmowers, lawn and garden tractors, snow throwers and the like, but may also be applied to larger implements and vehicles.

Hydrostatic transmissions transmit rotary mechanical motion, typically from an internal combustion engine, to fluid motion, typically oil, and then back to rotary mechanical motion to rotate a pair of drive axles in order to propel the vehicle. The hydrostatic transmission controls the output rotary mechanical motion such that varying output speeds in the forward and reverse directions are possible with a single speed input rotary mechanical motion. Such transmissions have utilized radial piston pumps and motors, axial piston pumps and motors and hybrid transmissions wherein the pump may be of the radial piston design, for example, and the motor formed as a gear pump. The speed of the output of the transmission is typically controlled by varying the eccentricity of the pump track ring or swash plate angle.

A typical construction of the hydrostatic transmission component of the transaxle includes a pump and motor block, supporting the pump and motor, which requires either partial immersion in transmission fluid, or a conduit to supply the pump and motor block with transmission fluid. Many hydrostatic transmission designs lack a filter to filter foreign particles from the fluid prior to such fluid being introduced to the block. Hydrostatic transmissions operating without a filter may be prone to increased maintenance and a shorter life due to debris, contained in the fluid, damaging bearing surfaces and obstructing fluid passageways. Hydrostatic transmission designs which incorporate a filter generally provide an annular filter cartridge between the block and a lower portion of a casing to filter fluid which is drawn through the periphery of the filter. The axial ends of the filter, otherwise open, are overlaid respectively by the casing wall and the lower surface of the block. The axial end of the filter which abuts the block may not be larger than the surface area of the block or unfiltered fluid will be allowed to pass into the pump and motor block. The filter, generally contained within the surface area of the block, may be prone to premature loading of debris due to its limited size. As the filter becomes loaded with debris, performance of the hydrostatic transmission diminishes and further operation of the transmission may result in permanent damage. However, frequently replacing the filter is not an attractive solution since removing the filter is often difficult, requiring substantial disassembly of the implement which corresponds to a significant expense.

Furthermore, the surfaces of the block and the casing which are in contact with opposing axial filter ends must be relatively smooth and flat to provide a suitable seal to prevent unfiltered fluid to pass into the pump and motor block. One problem with this type of filtering arrangement is that additional machining to the block and/or the casing corresponds to a significant increase in cost.

Yet another type of filter arrangement includes wedging a solid piece of filtering material, having fine pores, between the rough surfaces of the block and the casing to provide filtering of the transmission fluid prior to its introduction to the suction ports of the pump and motor block. A problem associated with the solid filter is that it is prone to rapid clogging or loading, requiring an increase in maintenance, which corresponds to a significant maintenance cost.

SUMMARY OF THE INVENTION

The present invention overcomes the disadvantages associated with prior hydrostatic transmissions by providing a hydrostatic transmission assembly including a hydraulic pump and motor mechanism having a pump, a motor and at least one fluid passageway therebetween, a source of transmission fluid, at least one projection attached to the hydrostatic pump and motor mechanism which has a suction port therein, and a filter assembly comprising a filter element attached to an impermeable wall. The pump and motor are fluidly connected through the passageway and the passageway is in fluid communication with the source of transmission fluid through the suction port. The impermeable wall includes at least one hole therethrough and the projection extends through the hole and is sealingly engaged with the impermeable wall. Substantially all transmission fluid received by the pump and motor mechanism is passed through the filter element.

The present invention further provides a transaxle including at least one casing and the hydrostatic transmission drivingly engaged with an axle mechanism. The filter element extends between the impermeable wall and the casing to define a sealed suction chamber therebetween and any debris entrained in the transmission fluid is blocked from entering the suction chamber by the filter element.

BRIEF DESCRIPTION OF THE DRAWINGS

The above-mentioned and other features and objects of this invention, and the manner of attaining them, will become more apparent and the invention itself will be better understood by reference to the following description of the invention taken in conjunction with the accompanying drawings, wherein:

FIG. 5 is a sectional view of the pump and motor block along line 5—5 of FIG. 4;

FIG. 6 is an exploded view of the filter and pump block assembly of FIG. 3;

FIG. 7A is an elevational view of the pump block of FIG. 3, showing the filter and the casing in section and portions of the bosses are broken away to illustrate the direction of fluid flow into one of the ports;

FIG. 9 is a fragmentary view of the filter and the casing in section, along line 9—9 of FIG. 8.

Figure 1:
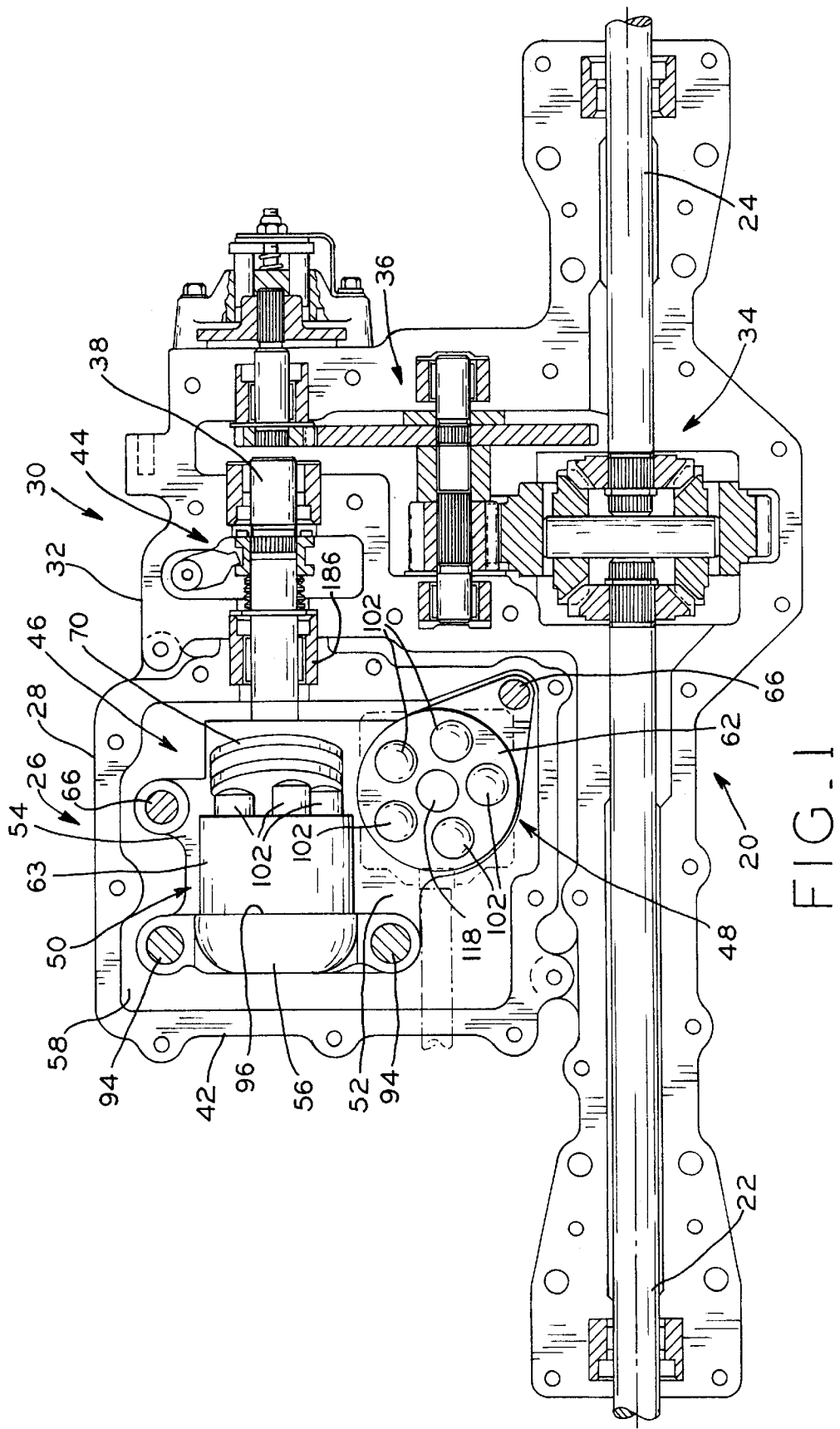
FIG. 1 is a sectional view of a first embodiment of a transaxle according to the present invention taken along a plane extending along interfacing surfaces of the casing halves.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention, and such exemplifications are not to be construed as being exhaustive or to limit the scope of the invention in any manner.

DETAILED DESCRIPTION OF THE INVENTION

Figure 2:
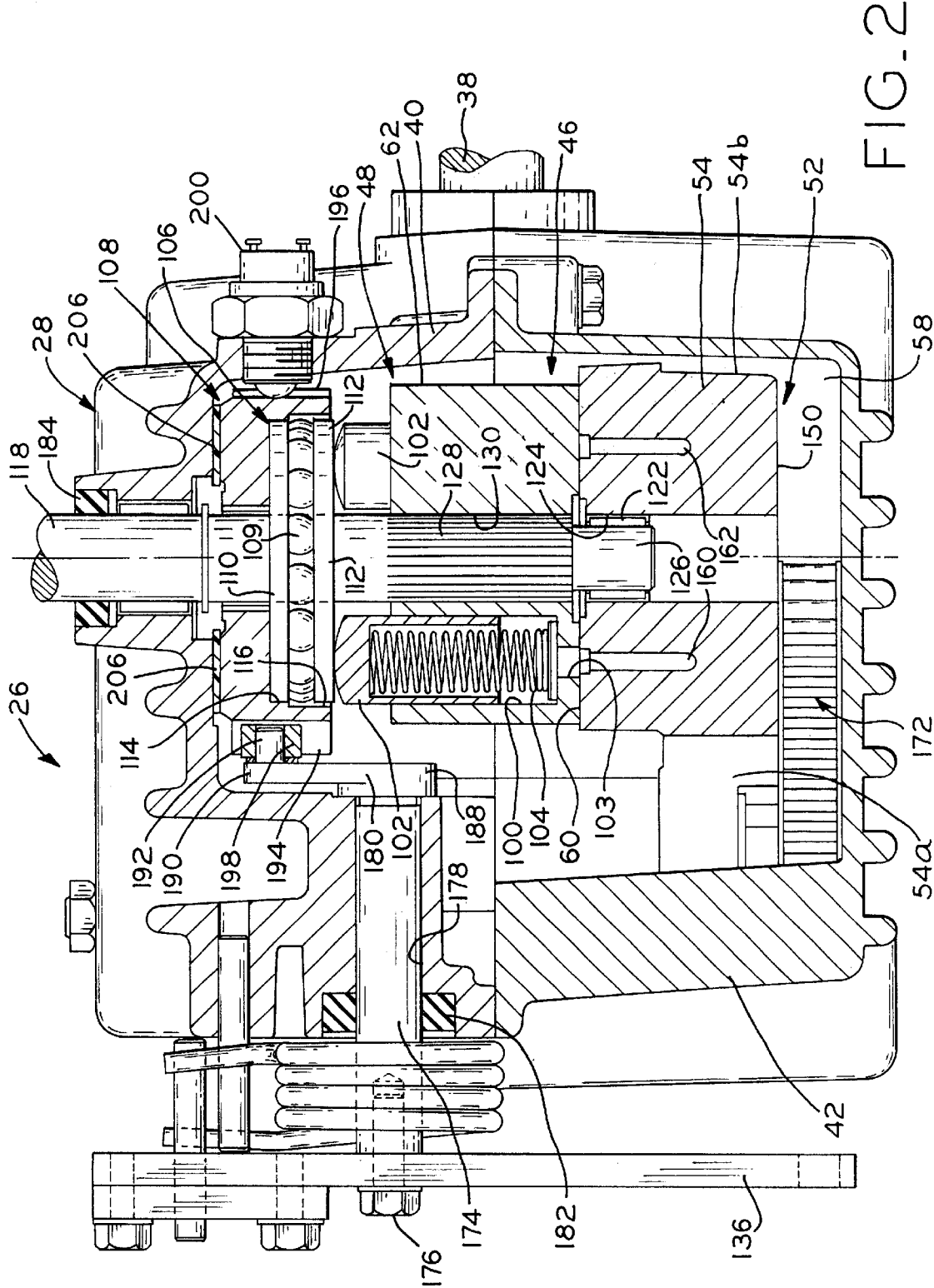
FIG. 2 is a sectional view of the hydrostatic transmission of the transaxle of FIG. 1 taken along a plane extending along the rotational axis of the input shaft, showing the hydrostatic pump assembly.

Referring to FIG. 1, transaxle 20 is driven by a power source (not shown), typically an internal combustion engine, whereby transaxle 20 transfers power generated from the power source to a variable and controllable power provided to a pair of drive axles 22 and 24, respectively. Transaxle 20 is modular in design and includes hydrostatic transmission module 26 which is enclosed in casing 28 and is removably attached to axle mechanism module 30. The modular transaxle is disclosed in pending application Ser. No. 09/498,692, filed Feb. 7, 2000. Axle mechanism module 30 is enclosed in axle mechanism housing 32 and includes differential mechanism 34, reduction gear train 36 and output shaft 38. Output shaft 38 is engaged with reduction gear train 36 which, in turn, drives differential mechanism 34 to provide power to rotate axles 22 and 24. Casing 28 of hydrostatic transmission module 26 includes a pair of casing halves, upper casing half 40 (FIG. 2) and lower casing half 42 (FIGS. 1–2). Output shaft 38 extends between hydrostatic transmission casing 28 and axle mechanism housing 32 and includes a mechanical disconnect mechanism 44 of the type disclosed in U.S. Pat. No. 5,701,738 and in pending application Ser. No. 09/498,692, both assigned to the assignee of the present application, the disclosures of which are both expressly incorporated herein by reference. Mechanical disconnect mechanism 44 is provided to disengage axle mechanism module 30 from hydrostatic transmission module 26.

Figure 3:
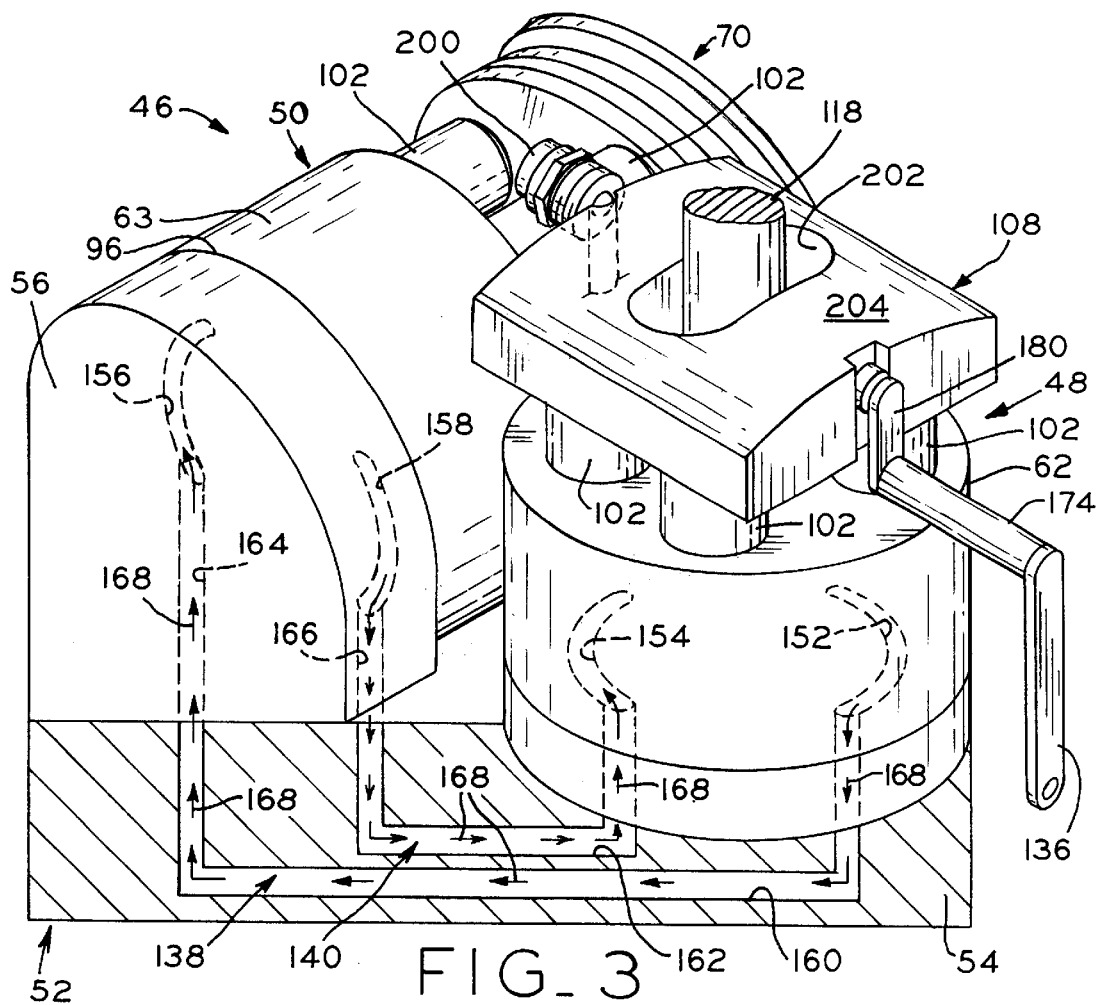
FIG. 3 is a perspective view of the pump and motor assembly of the hydrostatic transmission of FIG. 2, partially in section, illustrating fluid passageways extending through the pump and motor block.
Figure 4:
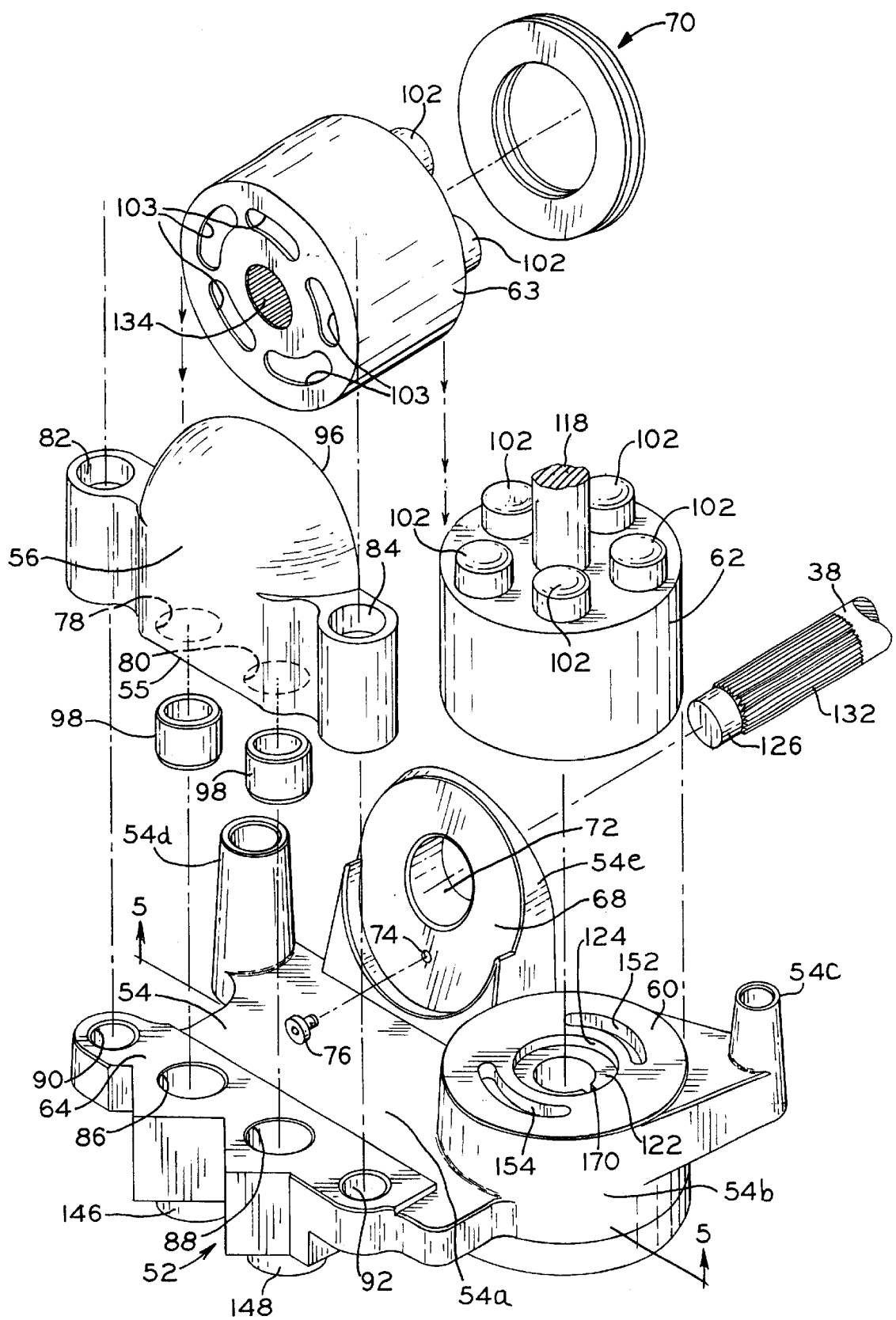
FIG. 4 is an exploded view of the pump and motor assembly of FIG. 3.

Referring to FIG. 2, shown is hydrostatic transmission module 26 of transaxle 20 (FIG. 1), including pump and motor mechanism 46 which comprises hydraulic pump 48 and hydraulic motor 50 (FIGS. 1, 3) mounted on pump and motor block assembly 52 (FIG. 3). Referring to FIG. 4, pump and motor block assembly 52 includes a two piece structure wherein pump block 54 is joined with motor block 56 to provide a single unit. Pump and motor block assembly 52 is enclosed by casing 28 and within lower half 42 of casing 28 is sump 58 (FIG. 2). Sump 58 contains a quantity of a transmission fluid such as oil therein. Pump block 54 includes rectangular portion 54a joined with cylindrical portion 54b having raised circular face 60 which provides a mounting surface for pump cylinder barrel 62. Rectangular body portion 54a of pump block 54 includes raised rectangular motor block mounting surface 64 which provides a surface to which surface 55 of motor block 56 is attached. A pair of annular column portions 54c, 54d project outwardly from rectangular portion 54a of pump block 54 and a pair of fasteners 66 (FIG. 1) extend through each column portion 54c, 54d and fasten pump and motor block assembly 52 to upper half 40 of casing 28. Bearing cradle 54e projects from rectangular portion 54a and provides inclined face 68 for fixed swash plate or thrust bearing assembly 70 to abut therewith. Face 68 is generally smooth and flat in the as-cast condition such that little if any machining is required in preparation for its engagement with thrust bearing assembly 70. Pump block 54 may be constructed of an aluminum alloy and manufactured by, for example, a foam insert casting process. Face 68 is preferably inclined at a 15° angle respective of the vertical axis, for example, and is provided with clearance hole 72 which provides rotational clearance for output shaft 38. Threaded hole 74 is provided in face 68 to threadably receive stop member 76, such as a screw, for example, to retain thrust bearing assembly 70 in abutment with annular face 68. The pump and motor block assembly is disclosed in pending application Ser. No. 09/498,666, filed Feb. 7, 2000, assigned to the assignee of the present application, the disclosure of which is expressly incorporated herein by reference.

As best seen in FIG. 4, motor block 56 includes a pair of circular fluid ports 78, 80 positioned between a pair of fastener clearance holes 82, 84, which respectively align with, and respectively overlay, a pair of circular fluid ports 86, 88 and a pair of outer holes 90, 92 within pump block 54. A pair of screws 94 (FIG. 1) extend through respective clearance holes 82, 84 within motor block 56 and through holes 90, 92 within pump block 54 and are threaded into upper half 40 (FIG. 2) of casing 28. Motor block 56 includes raised circular mounting face 96 to which motor cylinder barrel 63 is rotatingly mounted (FIG. 1). A pair of inserts 98 made of, for example, a metallic material through a powder metal process, are placed between respective pump and motor blocks 54, 56 to seal and align fluid ports 86, 88 of pump block 54 with fluid ports 78, 80 of motor block 56.

As best seen in FIG. 2, pump cylinder barrel 62, includes a plurality of radially spaced cylinders 100 each having a reciprocating piston 102 therein. Similarly, motor cylinder barrel 63 includes a plurality of radially spaced cylinders 100 having reciprocating pistons 102 therein. Motor cylinder barrel 63, and pistons 102 are substantially identical to that of pump cylinder barrel 62 and pistons 102 therein to reduce the overhead associated with implementing separate additional components. Springs 104 are provided within each cylinder 100 to urge each piston 102 toward and into continuous contact with its respective swash plate as described below.

Referring again to FIG. 2, hydraulic pump 48 includes annular thrust bearing assembly 106 recessed within swash plate 108 and centered relative to pump cylinder barrel 62. Thrust bearing assembly 106 is generally annular in structure and includes a plurality of radially spaced ball bearings 109 captured between a pair of races or grooved plates 110 and 112. Plate 110 of thrust bearing 106 may be engaged within bore 114 of swash plate 108 through an interference fit, for example. Swash plate 108 is provided with counterbore 116 having a diameter slightly larger than bore 114 such that plate 112 of thrust bearing 106 may rotate relative to swash plate 108 and plate 110 of thrust bearing assembly 106.

Operation of hydrostatic pump and motor mechanism 46 will now be described. Rotational motion of pump cylinder barrel 62, generally provided by a constant speed power source (not shown) via input shaft 118 (FIGS. 2–4), urges pistons 102 to reciprocate, which forms hydraulic pressure within cylinders 100 of pump cylinder barrel 62. Pressurized transmission fluid is successively discharged from pump cylinder barrel 62 through each port 103, positioned at an axial end of pump cylinder barrel 62 (FIG. 2). Pump 48 and motor 50 are fluidly connected through passageways provided within pump and motor block assembly 52 which transfer hydraulic pressure formed in pump cylinder barrel 62 to pistons 102 within motor cylinder barrel 63. Consequently, the pressure formed within the motor cylinder barrel 63 is converted back to rotary motion of the motor cylinder barrel 63 as reciprocating motor pistons are successively urged against slanted and fixed swash plate assembly 70 (FIG. 1).

Input shaft 118, extended through pump cylinder barrel 62, includes end 120 which is rotatably supported by bearing 122 recessed within bore 124 of pump block 54. Bearing 122 may be a solid annular ring made from a bronze bearing material for example, or alternatively, a roller bearing assembly of known construction. Similarly, motor block 56 includes a bearing (not shown) substantially identical to bearing 122 which is provided within a centrally located bore (not shown) of face 96 of motor block 56 to rotatably support end 126 of output shaft 38 (FIG. 4). Input shaft 118 includes splined portion 128 engaged with splined portion 130, of pump cylinder barrel 62. Similarly, output shaft 38 includes splined portion 132 engaged with splined portion 134 of motor cylinder barrel 63 (FIG. 4). Those having ordinary skill in the art will understand that as the angle of swash plate 108 is selectively controlled, via user control of control lever 136 (FIG. 2), pistons 102, within pump cylinder barrel 62, vary in stroke depending on swash plate angle. The hydraulic pressure, dependent on stroke length of reciprocating pistons 102, is transmitted to motor 50 through passages provided in pump and motor block 52 as described below.

As best seen in FIG. 3, continuous passageways 138, 140 are located in pump and motor block assembly 52 to hydraulically connect pump cylinder barrel 62 to motor cylinder barrel 63. Passageways 138, 140 include ports 142, 144 (FIG. 5) provided in raised bosses 146, 148 which extend from a peripheral surface or bottom surface 150 (FIG. 6) of pump block 54 (FIG. 6) to arcuate openings 156, 158 (FIG. 3) in motor block 56. A pair of check valves (not shown), of well known construction, are positioned within ports 142, 144 to allow transmission fluid into pump and motor block assembly 52 through ports 142, 144 and prevent fluid from discharging pump and motor block assembly 52 through ports 142, 144. Continuous passageways 138, 140 respectively include a pair of arcuate openings 152 and 154 in pump block 54 (FIG. 4), fluidly connected with arcuate openings 156 and 158, located in motor block 56. A pair of sub-passageways 160 and 162, are located in pump block 54, and are respectively connected with a pair of sub-passageways 164 and 166, located in motor block 56. Passageways 138 and 140 may be formed within pump and motor block assembly 52 by, for example, a machining operation, e.g., drilling or milling. Alternatively, passageways 160 and 162 may be formed by utilizing foam cores during the casting process to eliminate or substantially reduce required machining. Additional machining to pump and motor block assembly 52 may include milling arcuate pump openings 152, 154, in pump block 54, and arcuate openings 156, 158 in motor block 56 to ensure that a proper hydraulic connection between the cylinder barrels 54, 56 and pump and motor block assembly 52 is established.

It may be seen that pump 48 and motor 50, hydraulically connected through passageways 138, 140 provide a hydraulic circuit having a flow direction indicated by arrows 168. Circulation of fluid through the hydraulic circuit is initiated by the reciprocating movement of pistons 102 within pump cylinder barrel 62. Hydraulic make up fluid is to be drawn into the circuit through suction port 142 (FIG. 6) in pump block 54 from sump 58 (FIG. 2). The fluid is then transported from pump cylinder barrel 62 to motor cylinder barrel 63 through passageway 138 as shown by arrows 168 in FIG. 3. Transmission fluid is returned to pump cylinder barrel 62 from motor cylinder barrel 63 through passageway 140. Transmission fluid exits the circuit through slot 170 (FIGS. 5, 8) located adjacent to bore 124 within pump block 54 and is reclaimed by sump 58. Additional fluid may be leaked from the hydraulic circuit to sump 58 due to losses associated with the hydraulic circuit, such as fluid leakage through clearances between pistons 102 and corresponding cylinders 100, for example. The reclaimed transmission fluid is then reintroduced into the transmission fluid circuit after it is drawn through filter assembly 172 (FIGS. 2, 6) by pump 48. Notably, the direction of fluid through the circuit may be reversed, by a user oppositely tilting swash plate 108 through linkage means, for example. As a consequence, the direction of rotation of output shaft 38 and drive axles 22, 24 is reversed.

Referring to FIGS. 2 and 3, control lever 136, externally positioned relative to casing 28 (FIG. 2), is attached to control rod 174 by screw 176 (FIG. 2). Referring to FIG. 2, control rod 174, rotatably supported within bore 178 of casing 28, includes radially extended control arm 180 provided internally within casing 28. Control rod 174 is sealed relative to casing 28 through shaft seal 182 to prevent leakage of transmission fluid therealong. Similarly, input shaft 118 and output shaft 38 (FIG. 1) are sealed relative to casing 28 through shaft seals 184, 186 (FIG. 1). Control arm 180 includes first end 188 attached to control rod 174, and second end 190 extended radially outwardly relative to an axis of rotation of control rod 174. Second end 190 of control arm 180, engaged with swash plate 108, rotatably tilts when control rod 174 is selectively rotated via user manipulation of control lever 136. Pin 192 is attached to second end 190 of control arm 180 and extends into slot 194 located on periphery portion 196 of swash plate 108. Friction roller 198 is positioned on pin 192 and is free to rotate about pin 192 to provide sliding engagement with slot 194 of swash plate 108. Selectively positioning control lever 136, may be carried out by an operator depressing a foot pedal linked thereto through typical linkage means (not shown), for example. Further, it may be seen that hydrostatic transmission 26 is fitted with a neutral start switch 200 (FIGS. 2 and 3), which registers directly off of the swash plate 108, to prevent engine start-up when the transmission is engaged. The control lever and the neutral start switch is disclosed in pending application Ser. No. 09/671,796, filed Sep. 27, 2000, assigned to the assignee of the present application, the disclosure of which is expressly incorporated herein by reference.

Referring to FIG. 3, input shaft 118 is extended through oval slot 202, which is centrally positioned relative to first lateral surface 204 of swash plate 108. Surface 204 of swash plate 108 is arcuate and rotatably engages a pair of bearing strips 206 (FIG. 2) made of a homogenous TEFLON and DELRIN composite, for example. Bearing strips 206 are attached to an interior portion of casing 28 and are of the type disclosed in pending application Ser. No. 09/498,692, filed Feb. 7, 2000. Bearing strips 206 provide low friction surfaces to guide the upper surface 204 of swash plate 108 as it swings through an arc in response to rotation of control rod 174.

FIG. 7A illustrates a first embodiment of a transaxle having a hydrostatic transmission and filter assembly according to the present invention. Filter assembly 172 is provided between pump block 54 and casing 28 to prevent foreign particles or materials, carried by the transmission fluid, from being introduced into the hydrostatic pump and block mechanism 46 (FIG. 2). Referring to FIGS. 6 and 7A, pump block includes a pair of projections or bosses 146 and 148 which extend from bottom surface 150 of pump block 54 and respectively include cylindrical surfaces 208 and 210. Bosses 146 and 148 also include faces 212 and 214, respectively, in which are provided entryways for respective ports 142 and 144 (FIG. 6). Bottom surface 150 of rectangular body portion 54a of pump block 54, and additionally, cylindrical surfaces 208 and 210 of bosses 146 and 148, are all as-cast surfaces which require little if any machining in preparation for being mounted with each filter assembly 172 as described below.

It may be seen that filter assembly 172, illustrated in FIG. 6 as being separated from the pump block 54, includes annular filter element 216 provided with end 218 enclosed by impermeable wall 220 and open end 244. Impermeable wall 220 has an outer edge 224, which is bonded to axial end 218 of filter element 216 through a molding process, for example, and inner portion 222 provided with through holes 252, 254 described further below. Impermeable wall 220 may be made from a flexible heat resistant polymer such as urethane sheet, for example, or other similar material which retains its durability at elevated temperatures. Referring to FIG. 9, axial end 244 of filter element 216 is positioned adjacent to casing 28 and includes flexible rim 246 bonded thereto to form bonded joint 248. Flexible rim 246 may be manufactured from, for example, a fluorocarbon material. Similarly, impermeable wall 220 is married to axial end 218 of filter element 216 to form bonded joint 250.

Figure 7B:
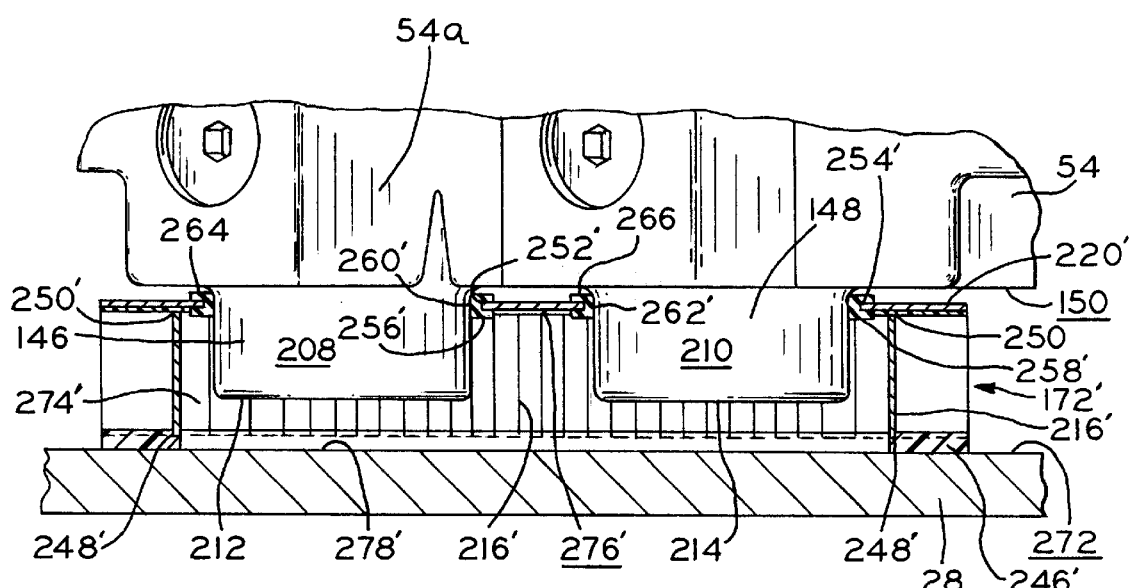
FIG. 7B is an elevational view of a second embodiment of a transaxle according to the present invention, illustrating the filter and the casing in section.
Figure 8:
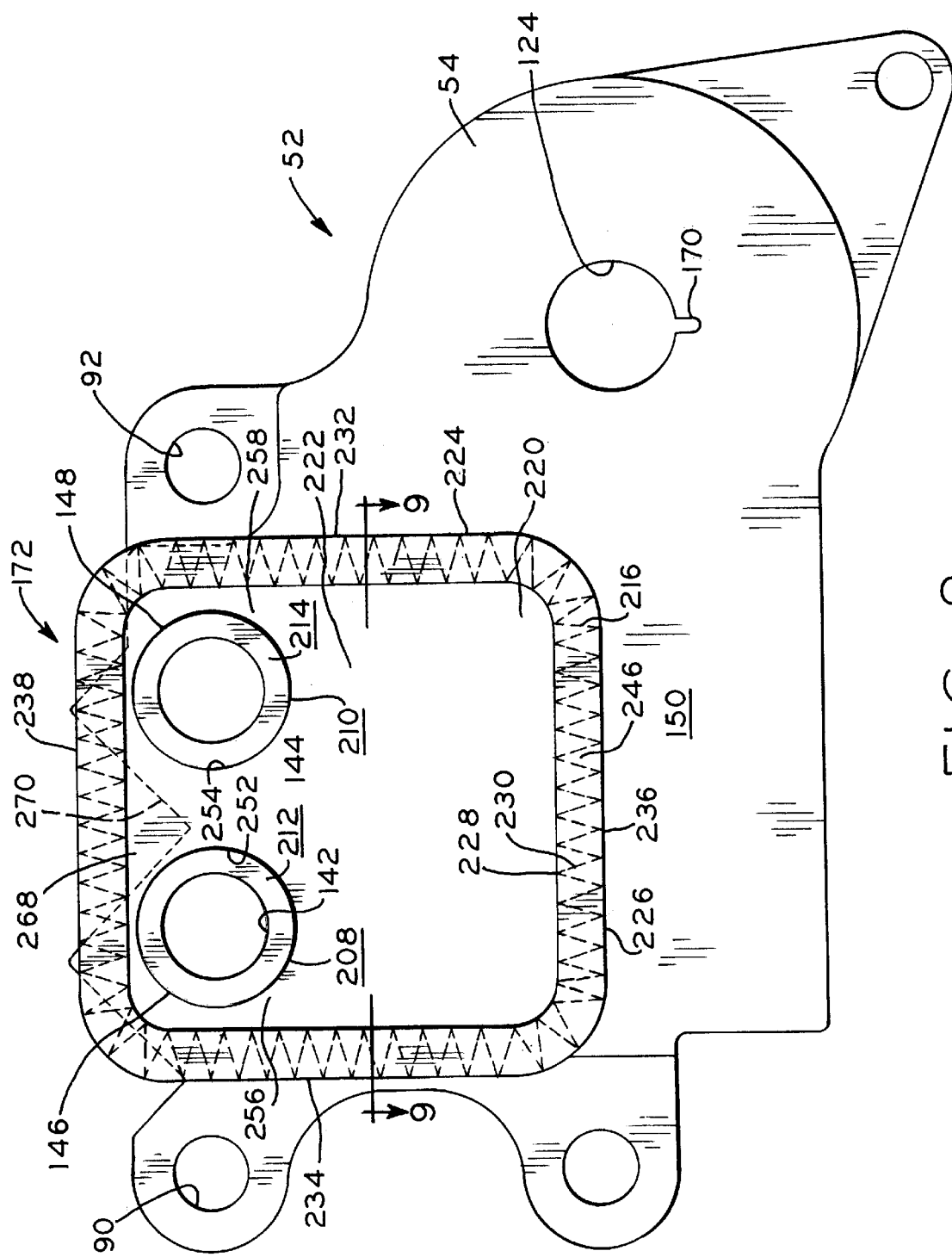
FIG. 8 is a sectional view of the pump block and filter along line 8—8 of FIG. 7A.

Referring to FIGS. 6–9, filter element 216 is continuous and may be made from a corrugated fibrous filter material such as paper fiber, for example, or any other material as is customary. Notably, substantially all of the transmission fluid, received into ports 142, 144 of pump and motor block assembly 52, is drawn through filter element 216 to prevent debris from entering hydrostatic pump and motor mechanism 46. Referring to FIG. 8, annular filter element 216 includes a plurality of spaced ridges 226 in an alternating relationship with grooves 228 and are separated by wall panels 230 (FIGS. 8 and 9). Referring to FIGS. 6 and 8, it may be seen that filter assembly 172 forms a parallelepiped comprised of two similar and opposingly positioned sides 232, 234 adjacently connected to two similar and opposingly positioned sides 236, 238 and enclosed by impermeable wall 220 and casing 28. As best seen in FIG. 9, filter element 216 includes outer margins 240 and inner margins 242. Fluid entering ports 142 and 144 from sump 58 first passes through outer margins 240 of filter element 216, and subsequently proceeds through inner margins 242 as illustrated by flow arrow 245 in FIG. 7A. Thus it is seen that transmission fluid is directed through filter element such that debris is prevented from entering hydrostatic pump and motor mechanism 46 with fluid from the sump.

Referring to FIGS. 6, 7A and 8, impermeable wall 220 of filter 172 is provided with a pair of through holes 252 and 254. In the first embodiment of a hydrostatic transaxle having a filter assembly 172 arranged with hydrostatic transmission 26, impermeable wall 220 includes edges 256, 258 which respectively define holes 252, 254. Edges 256, 258 are resiliently expanded to conform to cylindrical surfaces 208 and 210 of bosses 146, 148 which extend through holes 252, 254. Holes 252 and 254 in impermeable wall 220 have diameters which, when the filter assembly 172 is removed from the pump block (FIG. 6), are slightly smaller than the diameters of bosses 146 and 148, so that when filter assembly 172 is fitted onto bosses 146 and 148 of pump block 54, respective edges 256 and 258 slightly stretch or expand around cylindrical surfaces 208, 210 to form sealed engagements 260 and 262, respectively (FIG. 7A).

Referring to FIG. 7B, a second embodiment of a hydrostatic transaxle having a filter assembly arranged with a hydrostatic transmission is shown. Certain elements are indicated by primed reference numerals which indicate that the element has been modified relative to the corresponding element of the first embodiment. Filter assembly 172' includes rigid impermeable wall 220', made from thin metal sheet stock, for example. The diameters of holes 252' and 254' are slightly larger than the diameters of bosses 146 and 148 provided on pump block 54. Bosses 146, 148 extend through holes 252', 254' without boss surfaces 208, 210 engaging the edges of the holes. Annular grommets 264, 266 are molded to impermeable wall 220', and include margin portions 256, 258 which are located adjacent to holes 252', 254'. Each grommet provides a through hole which is slightly smaller in diameter than the respective boss about which it fits. Edges 256', 258' which define the through holes for grommets 264, 266 respectively stretch, conforming to cylindrical surfaces 208, 210 of bosses 146, 148 to respectively form sealed engagements 260', 262'. Annular grommets 264, 266 are manufactured from a resilient polymer such as a nitrile or fluorocarbon material, for example, and may be integrally manufactured with impermeable wall 220'. Alternatively, each grommet 264, 266 may be separately formed and subsequently assembled with impermeable wall. The grommets includes a peripherally formed U-shaped groove which is slip-fitted into holes 252', 254' prior to mounting filter assembly 172' to pump block 54. In addition to sealably securing the grommets to the impermeable wall, the impermeable wall 220' is bonded to filter element 216', through a molding process, for example, to form bonded joint 250'.

Referring to FIG. 8, it may be seen that portion 268 of filter assembly 172 extends laterally outward relative to outer periphery 270 of pump block 54 such that filter 172 need not be entirely overlaid by bottom surface 150 of pump block 54 since the sealing relationship is formed at the site of the bosses 146, 148 rather than against block bottom surface 150.

Referring to FIGS. 2 and 7A, lower half 42 of transmission casing 28 includes surface 272 constituting the floor of sump 58. Flexible rim 246 of filter assembly 172 abuts surface 272 of casing half 42 to enclose the otherwise open axial end 218 of filter element 216. Alternatively, it is envisioned that axial end 244 of filter element 220 may be enclosed by a planar enclosure, such as a thin metallic sheet (not shown) bonded to axial end 224, for example. Yet another alternative (not shown) may include axial end 244 of filter element 216, rather than being an open annular structure, forming an enclosure such that reliance on casing 28 to enclose filter assembly 172 is no longer necessary. However, in the exemplary embodiments shown, it may be seen that filter assembly 172 is positioned between bottom surface 150 of pump block 54 and surface 272 of casing half 42, such that filter assembly 172 is substantially restrained therebetween. Further, it is envisioned that alternative transaxle types having a one-piece transaxle casing (not shown), rather than two separate casings, e.g., hydrostatic transmission casing 28 and axle mechanism housing 32, may similarly utilize filter assembly 172 within the unitary transaxle casing.

Referring to FIG. 7A, it may be seen that filter assembly 172 provides suction chamber 274 bound by inner margins 242 of filter element 216, surface 272 of lower half casing 42 and surface 276 of impermeable wall 220. Sealed engagement 278 is formed between flexible rim 246 and surface 272 of casing half 42. Referring to FIG. 7B, the filtered transmission fluid within suction chamber 274' is separated from unfiltered fluid within sump 58 by sealed engagements 260', 262', formed between impermeable wall 220' and bosses 146, 148, and sealed engagement 278', formed between flexible rim 246 and surface 272 of casing half 42. In operation, unfiltered transmission fluid in sump 58 reaches the filter element 216 of filter assembly 172 and debris entrained within the fluid is blocked from passing through filter 172 by filter element 216. Transmission fluid, substantially debris free, enters suction chamber 274 and is further drawn towards either port 142 or 144, i.e., depending on the direction of flow established by the hydraulic circuit.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydrostatic transmission assembly comprising:
   a hydraulic pump and motor mechanism comprising a pump, a motor and at least one fluid passageway hydraulically connecting said pump and said motor,
   a source of transmission fluid,
   at least one projection attached to said hydrostatic pump and motor mechanism including a suction port therein, said passageway in said pump and motor mechanism being in fluid communication with said source of transmission fluid through said suction port; and
   a filter assembly comprising a filter element attached to an impermeable wall, said impermeable wall including at least one hole therethrough, said projection extended through said hole and being sealingly engaged with said impermeable wall, wherein substantially all transmission fluid entering said pump and motor mechanism from said source of transmission fluid is passed through said filter element.

2. The hydrostatic transmission assembly of claim 1, wherein the pump and motor mechanism comprises a pump and motor block assembly, said passageway provided in said pump and motor block assembly.

3. The hydrostatic transmission assembly of claim 2, wherein said impermeable wall is partially overlaid by a surface of said pump and motor block assembly and a portion of said filter element is not overlaid by said surface of said pump and motor block assembly.

4. The hydrostatic transmission assembly of claim 2, further comprising at least one casing in which said pump and motor mechanism is disposed, said filter assembly being retained between said pump and motor block assembly and said casing.

5. The hydrostatic transmission assembly of claim 4, wherein said filter element defines a flexible rim portion, said rim portion being sealingly engaged with a surface defined by said casing.

6. The hydrostatic transmission assembly of claim 4, wherein said source of transmission fluid includes a sump at least partially defined by said casing, said suction port being submerged in said the transmission fluid in the sump.

7. The hydrostatic transmission assembly of claim 4, wherein said filter element includes inner margins, said inner margins extending between said impermeable wall and said casing to define a suction chamber therebetween.

8. The hydrostatic transmission assembly of claim 1, wherein said pump and motor mechanism includes a pair of projections each including a pair of suction ports therein, said pair of projections extended through a pair of holes included in said impermeable wall and each said projection being sealingly engaged with said impermeable wall.

9. The hydrostatic transmission assembly of claim 8, wherein said filter assembly substantially forms a parallelepiped.

10. The hydrostatic transmission assembly of claim 9, wherein said impermeable wall comprises a metallic material.

11. The hydrostatic transmission assembly of claim 1, further comprising a grommet, said at least one hole in said impermeable wall is defined by an edge, said grommet being disposed between said edge and said projection, wherein said impermeable wall and said projection are sealingly engaged by said grommet.

12. The hydrostatic transmission assembly of claim 1, wherein said impermeable wall comprises a resilient polymer.

13. The hydrostatic transmission assembly of claim 1, wherein said at least one suction port includes a one way check valve disposed therein whereby transmission fluid is prevented from discharge from said pump and motor mechanism through said suction port.

14. The hydrostatic transmission assembly of claim 1, further comprising an axle mechanism drivingly engaged with the hydrostatic transmission constituting a transaxle, said transaxle including at least one casing, said filter element extended between said impermeable wall and said casing to define a sealed suction chamber therebetween, wherein any debris entrained in the transmission fluid from said source of transmission fluid is blocked by said filter element from entering said suction chamber.

15. The hydrostatic transmission assembly of claim 14, wherein said axle mechanism and said hydrostatic transmission are disposed in said casing.

16. The hydrostatic transmission assembly of claim 14, wherein said hydrostatic transmission is enclosed within said casing and said axle mechanism is enclosed within a second casing, said axle mechanism is coupled to said hydrostatic transmission through a drive shaft, and said axle mechanism includes at least one drive axle operatively connected through a differential mechanism.

17. The hydrostatic transmission assembly of claim 14, wherein said pump and motor mechanism comprises a pump and motor block assembly, said filter assembly being retained between said pump and motor block and said casing.

18. The hydrostatic transmission assembly of claim 17, wherein said projection is integrally attached to a surface of said pump and motor block.

19. The hydrostatic transmission assembly of claim 17, wherein said pump and motor block defines a pair of projections each including a suction port therein, said projections extend through a pair of holes included in said impermeable wall, said impermeable wall sealing engaged with said pair of projections, wherein transmission fluid is continuously received by said pump and motor block from said source of said transmission fluid through one of said suction ports.

20. The hydrostatic transmission assembly of claim 19, wherein said projections are substantially circular and an outer edge defined by said impermeable wall is substantially rectangular.

21. The hydrostatic transmission assembly of claim 19, wherein said pair of projections extend through said pair of holes in said impermeable wall, said pair of projections are sealingly engaged with said impermeable wall by a pair of grommets.

22. The hydrostatic transmission of claim 1, wherein said hydrostatic transmission is a transaxle.

* * * * *